US005701402A

United States Patent [19]

Miyamoto et al.

[11] Patent Number: 5,701,402

[45] Date of Patent: Dec. 23, 1997

[54] IMAGE FORMING APPARATUS WITH DETACHABLE PROCESS UNIT

[75] Inventors: Kazuki Miyamoto; Naoyuki Ohki, both of Yokohama; Masaki Nakano, Ebina; Takahiro Ushiro, Kawasaki; Yasuo Fukazu, Kawasaki; Atsushi Chaki, Yokohama; Shinichi Takata, Kawasaki; Kazuhiro Ohyoshi, Wako, all of Japan

[73] Assignee: Canon Kabushiki Kaisha, Tokyo, Japan

[21] Appl. No.: 791,541

[22] Filed: Jan. 31, 1997

Related U.S. Application Data

[63] Continuation of Ser. No. 515,216, Aug. 15, 1995, abandoned.

[30] Foreign Application Priority Data

| | | | |
|---|---|---|---|
| Aug. 30, 1994 | [JP] | Japan | 6-228883 |
| Aug. 30, 1994 | [JP] | Japan | 6-228884 |
| Aug. 30, 1994 | [JP] | Japan | 6-228885 |

[51] Int. Cl.$^6$ ..... G06K 15/00

[52] U.S. Cl. ..... 395/115; 395/113

[58] Field of Search ..... 395/112, 113, 395/115, 116, 109, 101; 399/9, 24, 25, 27, 28, 29, 30, 31, 32, 36, 37

[56] References Cited

U.S. PATENT DOCUMENTS

| | | | |
|---|---|---|---|
| 4,521,847 | 6/1985 | Zihum et al. | 395/113 |
| 4,742,483 | 5/1988 | Morrell | 395/115 |
| 5,068,806 | 11/1991 | Gatten | 395/113 |
| 5,181,070 | 1/1993 | Masuda | 355/200 |

FOREIGN PATENT DOCUMENTS

| | | | |
|---|---|---|---|
| 0395320 | 10/1990 | European Pat. Off. . | |
| 58-132758 | 8/1983 | Japan . | |
| 60-83046 | 5/1985 | Japan . | |
| 43045365 | 2/1991 | Japan | 395/115 |

*Primary Examiner*—Arthur G. Evans
*Attorney, Agent, or Firm*—Fitzpatrick, Cella, Harper & Scinto

[57] ABSTRACT

An image forming apparatus such as a copier with a detachable process cartridge is provided with a first memory for storing the number of copying operations; a count renewing unit for increasing the count of the first memory and a second memory in the process cartridge, at each copying operation, a comparator for comparing the counts in the first and second memories, and a controller for determining a process condition specific to the process cartridge in case the counts do not mutually coincide. The service life of the process cartridge can be more precisely judged, and the process condition can be more appropriately determined for each process cartridge.

14 Claims, 9 Drawing Sheets

FIG. 3

| ADDRESS | DATA 16bit |
|---|---|
| 0 – 1 | SERIAL NO |
| 2 | COUNTER |
| 3 | IP-OFFSET |
| 4 | PRIMARY |
| 5 – 63 | VACANCY ($FFFF_H$) |

FIG. 4

| ORDER | START BIT | OPERATION CODE | 64 WORDS × 16 BITS | |
|---|---|---|---|---|
| | | | ADDRESS | DATA |
| READ (DATA READING) | 1 | 10 | $A_5$ – $A_0$ | $D_{15}$ – $D_0$ |
| WRITE (DATA WRITING) | 1 | 01 | $A_5$ – $A_0$ | $D_{15}$ – $D_0$ |
| WRAL (CHIP WRITING) | 1 | 00 | 01xxxx | $D_{15}$ – $D_0$ |
| ERASE (DATA ERASING) | 1 | 11 | $A_5$ – $A_0$ | – |
| ERAL (CHIP ERASING) | 1 | 00 | 10xxxx | – |
| EWEN (PROGRAM ENABLE) | 1 | 00 | 11xxxx | – |
| EWDS (PROGRAM DISABLE) | 1 | 00 | 00xxxx | – |

IMAGE FORMING APPARATUS WITH DETACHABLE PROCESS UNIT

This application is a continuation of application Ser. No. 08/515,216, filed Aug. 15, 1995, now abandoned.

BACKGROUND OF THE INVENTION

1. Field of the Invention

The present invention relates to an image forming apparatus provided with a detachable process unit.

2. Description of the Related Art

In an image forming apparatus such as a copying apparatus, it has been considered to attach a memory on an interchangeable process unit such as a drum unit and to judge the service life thereof from the content stored in the memory, such as the number of copies. However, if the process unit which is judged to have reached the end of the service life is merely replaced by a new process unit, the image forming conditions may be varied and the image may not be obtained in the optimum condition.

It is therefore conceivable to store, in the memory of the process unit, process conditions specific to the process unit and, when the process unit is mounted on the image forming apparatus, to automatically feed the process conditions into a memory of the apparatus itself or to execute a mode for measuring the image forming conditions, thereby determining the process conditions.

It is however cumbersome and time consuming to execute such measurement mode for the image forming conditions at each replacement of the process unit, and the appropriate image cannot be obtained without the execution of such mode.

Also in case of storing the number of copies in the memory of the process unit at every copying operation, it is necessary to confirm whether the copy count has been stored, but such confirmation, if conducted after the completion of the copying operation, cannot be made in case the power supply is turned off immediately after the copying operation.

It is also necessary to consider the countermeasure against improper tampering of the data stored in the memory of the process unit.

SUMMARY OF THE INVENTION

In consideration of the foregoing, an object of the present invention is to provide an image forming apparatus that overcomes the above-mentioned drawbacks.

Another object of the present invention is to provide an image forming apparatus for which the user or the service personnel is not required, at each replacement of the process unit, to cause the apparatus to read the process conditions specific to the process unit or to execute the measurement mode for determining the image forming conditions.

Still another object of the present invention is to provide an image forming apparatus capable of inhibiting the image forming operation based on improperly tampered with data of the data stored in the memory of the process unit.

Still another object of the present invention is to provide an image forming apparatus that allows it to easily be judged whether the deterioration in the image quality is caused by the process unit or by the image forming apparatus itself.

Still another object of the present invention is to provide an image forming apparatus wherein the timing of replacement of the process unit is allowed to be known.

Still other objects of the present invention, and the features thereof, will become fully apparent from the following description to be taken in conjunction with the attached drawings, and from the appended claims.

BRIEF DESCRIPTION OF THE DRAWINGS

FIG. 3 is a schematic view of data stored in a non-volatile memory 104;

FIG. 4 is a table showing operation codes of the non-volatile memory 104;

DETAILED DESCRIPTION OF THE PREFERRED EMBODIMENTS

Figure 1:
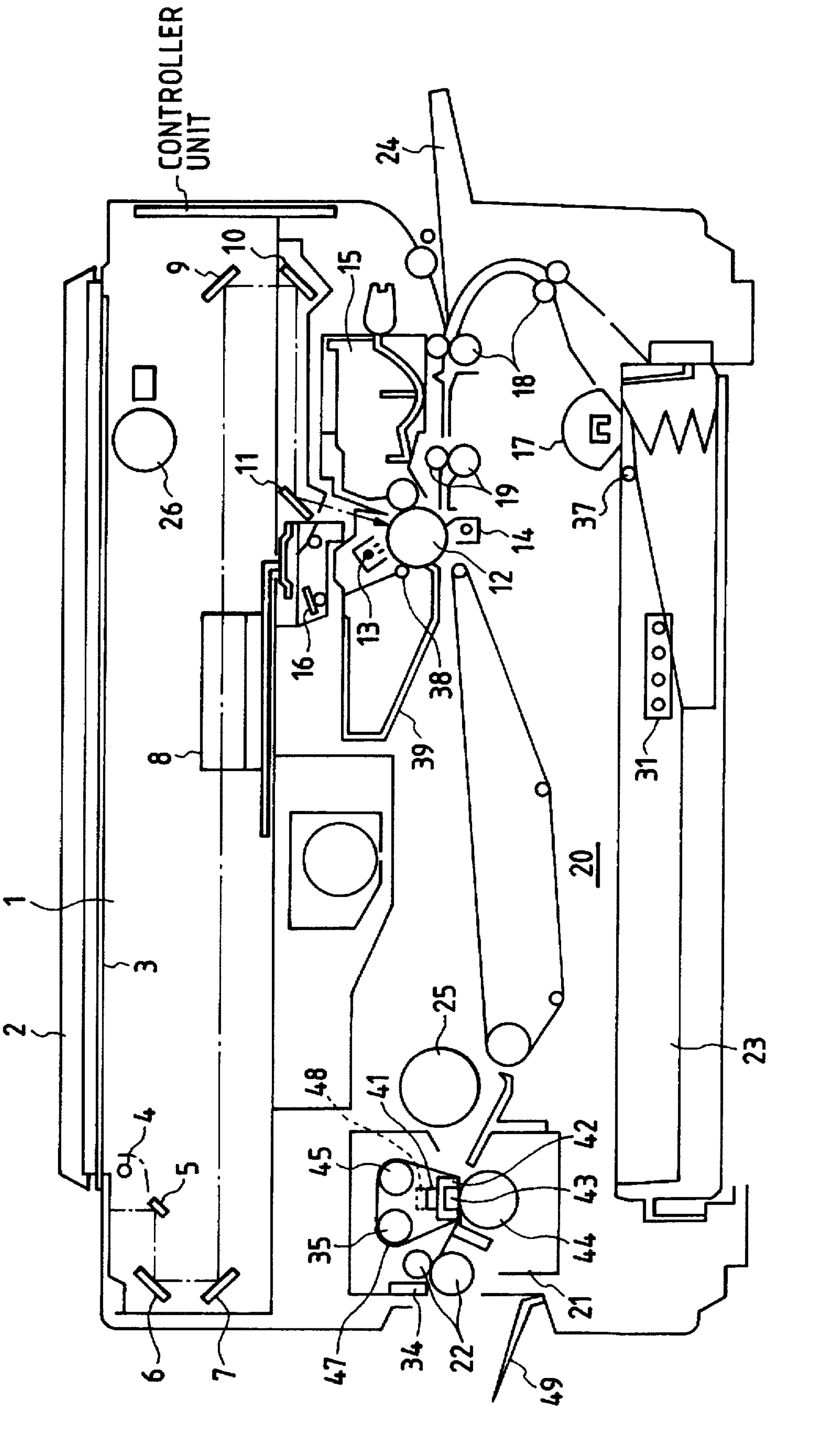
FIG. 1 is a cross-sectional view of an image forming apparatus.

Now the image forming apparatus of the present invention will be clarified in detail by an embodiment thereof, applied to a copying apparatus, of which a cross-sectional view is shown in FIG. 1.

There are shown a main body 1 of the copying apparatus; an original pressure plate 2; an original supporting glass plate 3; an exposure lamp 4; mirrors 5–7 and 9–11; a lens 8; a sheet feeding roller 17; transport rollers 18, 19; a transport unit 20; a fixing unit 21; sheet discharge rollers 22; and a sheet discharge tray 49.

The driving system consists of a main driving system for driving a sheet feeding unit, a sheet transporting unit, a photosensitive member and a fixing unit, and an optical driving system for driving an optical system constituting a load. The main driving system employs a DC brushless motor 25, while the optical system employs a stepping motor 26. In the optical driving system, phase energization signals are generated for supply to the different phases of the stepping motor 26. In the present embodiment, the stepping motor 26 is switched between the 2-phase driving method and the 1–2 phase driving method according to the velocity information set on the load.

The sheet feeding can be made either from a cassette 23 or from a multiple hand-feed tray unit In case of sheet feeding from the cassette 23, the sheet feeding state is controlled by a switch for detecting the presence or absence of the cassette 23, a switch group 31 for detecting the size of the cassette 23 and a switch 37 for detecting the presence or absence of sheet in the cassette 23, and, in case an abnormality is detected by these switches, a corresponding message is displayed on a display unit.

In case of multiple hand-feed sheet feeding, the sheet feeding state is controlled by a switch for detecting the state of the hand-feed unit 24, and, upon detection of an abnormality, a corresponding message is displayed on the display unit.

A photosensitive member 12 rotates clockwise in the drawing. It is charged by a primary charger 13 and then exposed in an exposure position to form a latent image, which is developed with toner by a developing unit 15, and the obtained toner image is transferred, in a transfer unit 14, onto a recording sheet supplied from the sheet feeding unit. After the toner image transfer, the photosensitive member 12 is subjected to the removal of remaining toner by a cleaning unit 38, then the elimination of retentive potential by a pre-exposure lamp 16, and is used again in the image forming process. The recording sheet, bearing the transferred toner image, is transported to a fixing unit 21 by a conveyor belt of a transport unit 20. A process cartridge 39, including the photosensitive member 12, the primary charger 13 and the cleaning unit 38, is detachably mounted on the copying apparatus 1.

The fixing unit 21 is provided with a drive roller 35, a tension roller 45 and a pressure roller 44.

A heater 43 of the fixing unit 21 is formed by printing a resistance member on a ceramic substrate, and has terminals at an end. The heater 43 is supported by a heat-resistant plastic supporter 42, on which a metal stay is mounted. An endless film 47 is provided around the drive roller 35, the tension roller 45 and the heater 43.

A temperature detecting element (thermistor) 41 is mounted on the metal stay and is in direct contact with the rear face of the heater 43. Another temperature detecting element 48 is similarly mounted on the rear face of the heater 43. This temperature detecting element 48 is positioned at an end of the heater 43 and is used for detecting the temperature of a sheet-free portion in case small-sized sheets are passed and expanding the gap between the sheets, because the temperature in such sheet-free portion becomes higher in case of such small-sized sheets.

The heater unit consisting of the heater 43, the plastic supporter 42 and the metal stay, and the endless film 47 are pressurized by the pressure roller 44.

Figure 2:
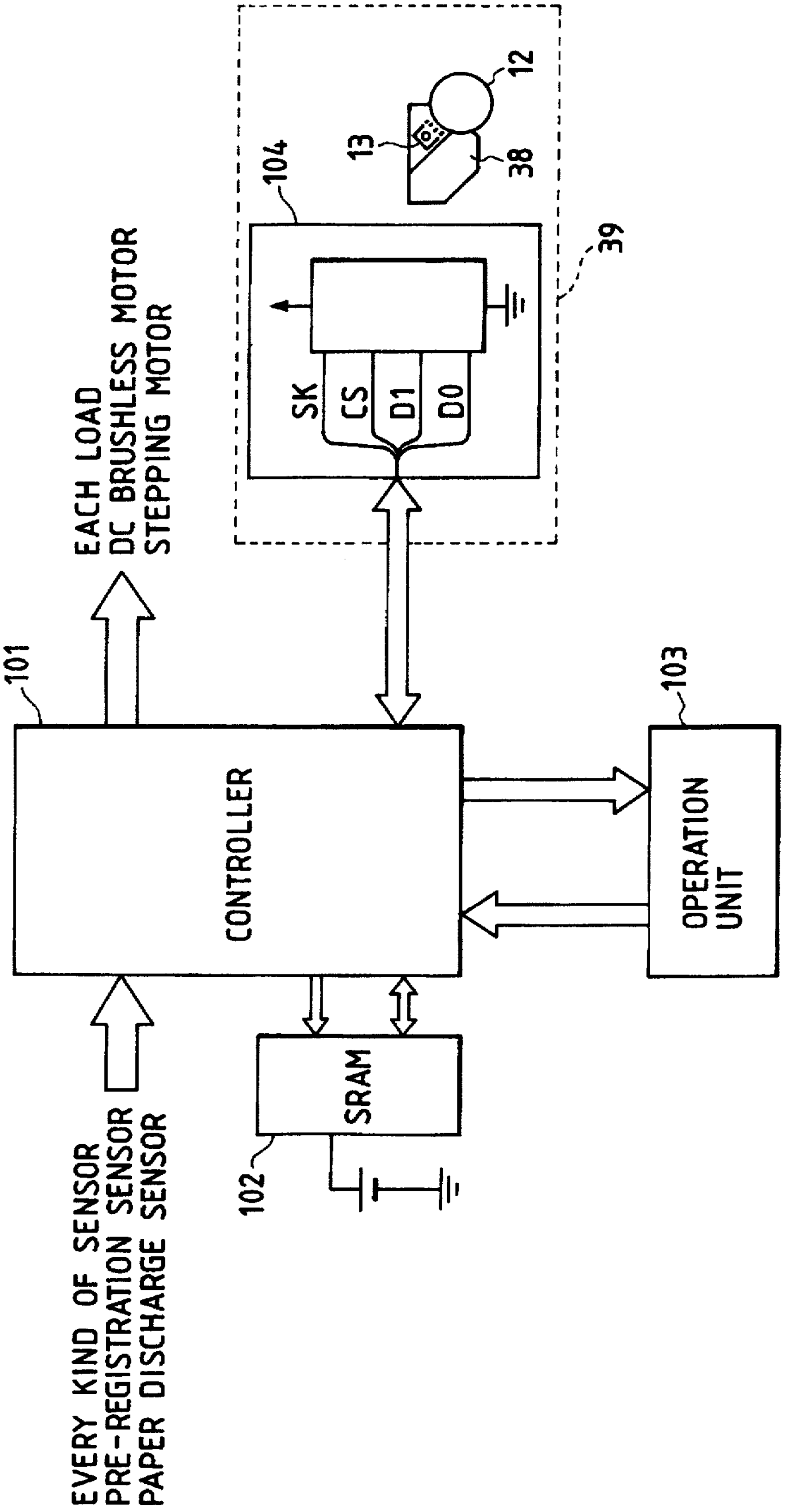
FIG. 2 is a block diagram of a control unit of the image forming apparatus.

FIG. 2 is a block diagram showing the configuration of a control unit of the copying apparatus constituting the image forming apparatus, wherein shown are a controller 101 for receiving signals from various sensors provided in the copying apparatus and controlling the functions of various loads such as the DC brushless motor and the stepping motor; a SRAM 102 for storing process conditions required for image formation, recovery information in case of sheet jamming, back-up information in case of a machine error, etc.; an operation unit 103 for setting the copy mode; and a non-volatile memory (EEPROM) 104 incorporated in the process cartridge 39 (including the photosensitive member 12, the primary charger 13 and the cleaner 38).

When the process cartridge 39 is mounted on the main body, the non-volatile memory 104 incorporated therein is automatically connected, by a drawer connector, to the controller 101. FIG. 3 illustrates the data stored in the non-volatile memory 104, wherein data of 16 bits are stored for each address as shown in the following:

| | | |
|---|---|---|
| Addresses 0–1 | serial numbers | 00XXXXXXH |
| Address 2 | counter value | XXXXH |
| Address 3 | process condition 1 | XXXXH |
| Address 4 | process condition 2 | XXXXH |
| Addresses 5–63 | vacant | FFFFH |

The process conditions 1 and 2 are used for varying the high voltage condition at the image formation, according to the fluctuation in the sensitivity of the photosensitive drum 12 in the process cartridge 39. The serial number is given to each process cartridge 39 and consists of 2 words (4 bytes), with uppermost bits always starting with "00". Each of the empty addresses 5–63 stores "FFFFH". The counter value is increased by one at each copying operation.

Figure 5A:
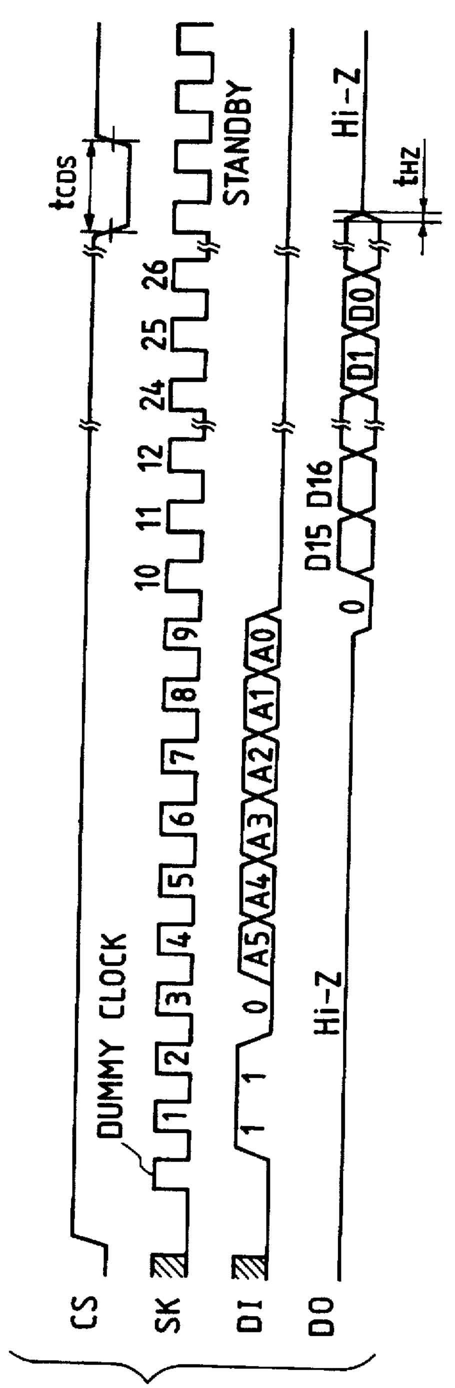
FIGS. 5A, 5B and 5C are timing charts of three modes (data read-out, data write-in and data erasure)
Figure 5B:
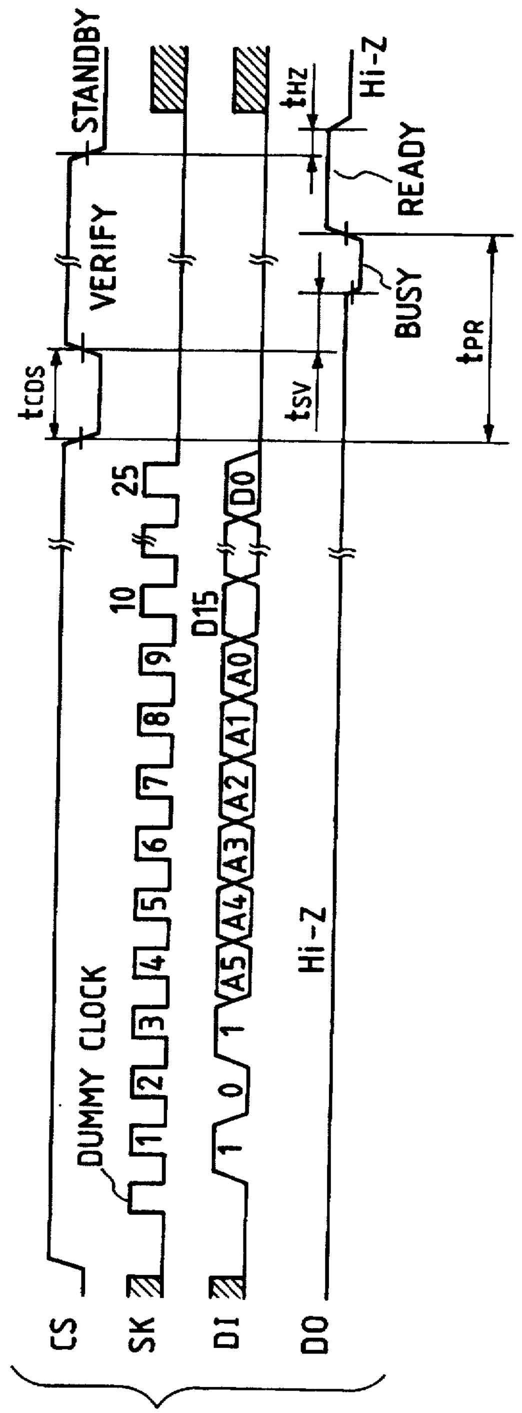
Figure 5C:
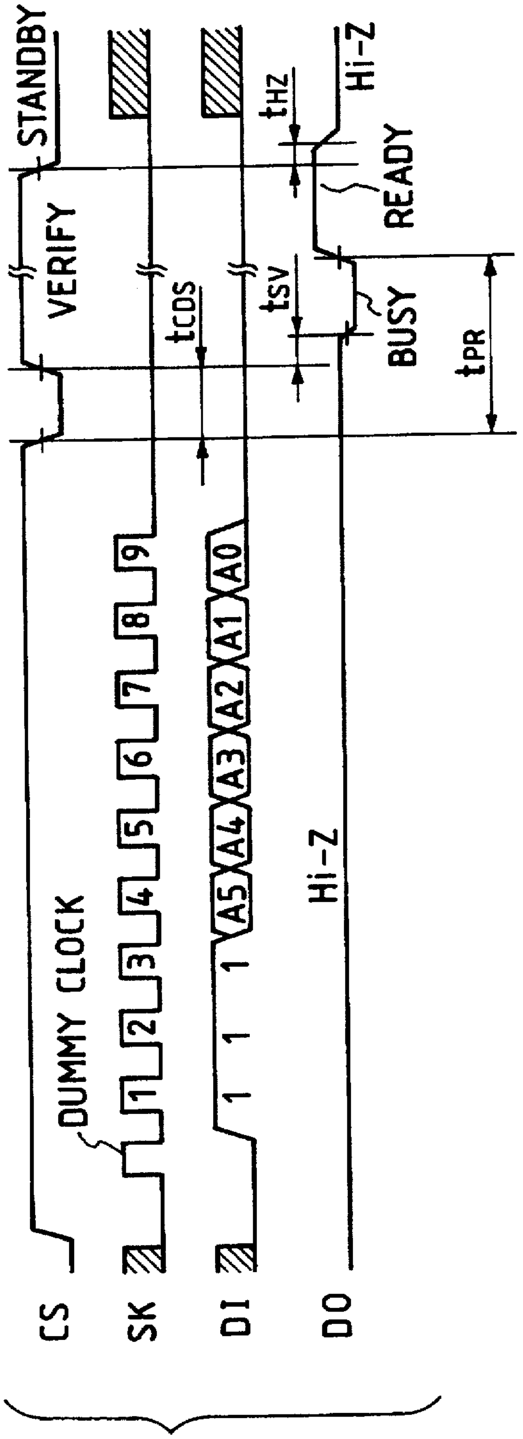

The read-out and write-in operations of the non-volatile memory (EEPROM) 104 are conducted in the following manner. FIG. 4 shows the operation codes of the non-volatile memory 104, and FIGS. 5A to 5C show the timing charts for three modes (data read-out, data write-in and data erasure). A symbol CS stands for chip select; SK for clock; DI for operation code and address input; and DO for data output.

A DI port fetches the operation code and the address supplied in synchronization with the upshift of a clock signal. A DO port releases data in synchronization with the upshift of a clock signal. Seven modes are realized by the combinations of the operation codes and the addresses.

As the photosensitive drum 12 in the process cartridge 39 shows fluctuation in sensitivity, the correction value for the sensitivity is measured for each process cartridge 39, and the measured correction value is stored as the process conditions 1 and 2 in the non-volatile memory 104. Also 0 is written as the counter value of the address 2, at a timing shown in FIG. 5B. Thus, the content of the non-volatile memory 104 is set in the following manner, at the initial shipment from the factory:

| | | |
|---|---|---|
| Addresses 0–1 | serial number | serially numbered from 1 |
| Address 2 | counter value | 0 |
| Address 3 | process condition 1 | −10 to 10 |
| Address 4 | process condition 2 | −63 to 63 |

Figure 6:
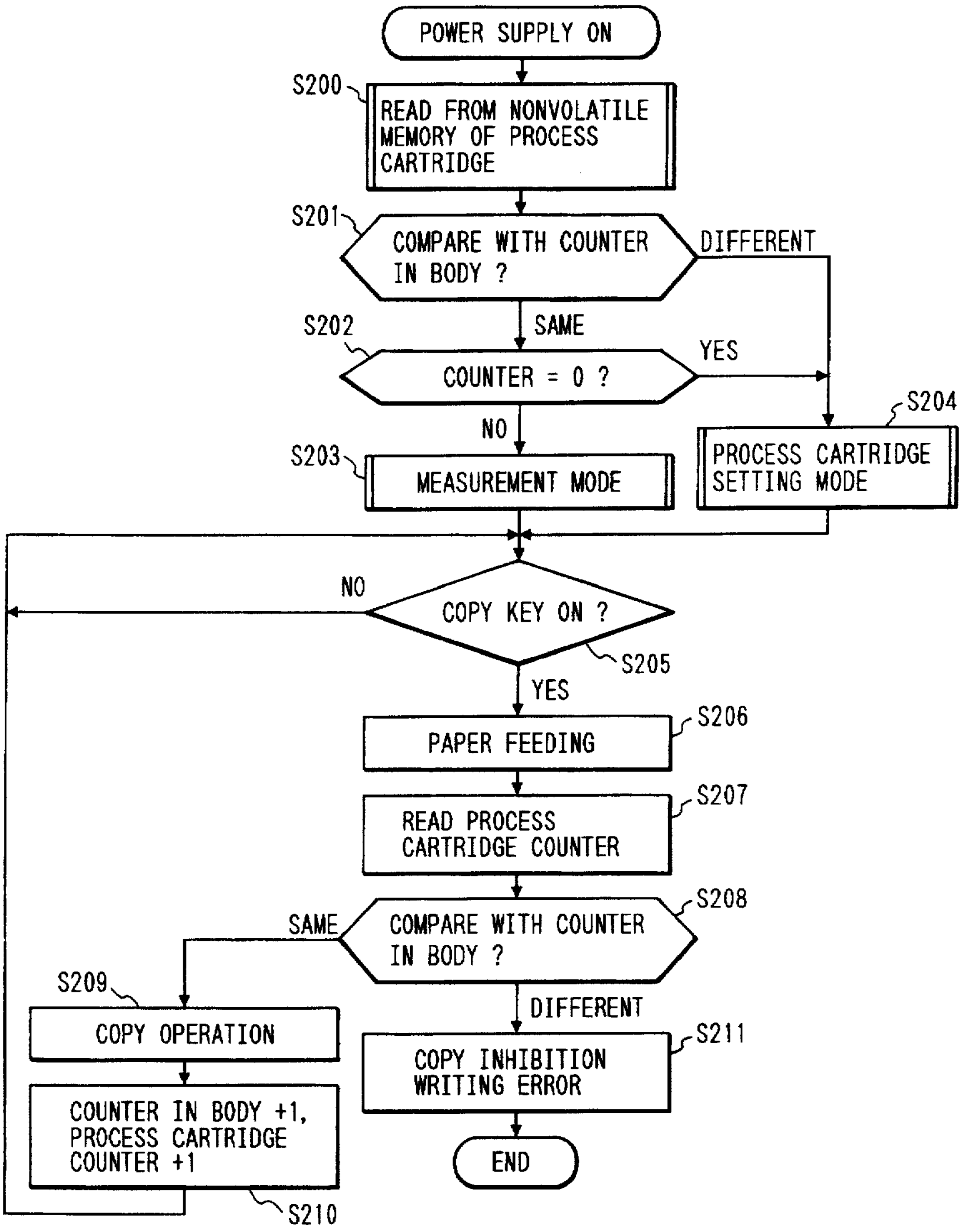
FIG. 6 is a flow chart showing a copying routine.

In the following there will be explained the function at the copying operation, with reference to a flow chart shown in FIG. 6. When the process cartridge 39 is newly mounted on the image forming apparatus and the power supply is turned on, the controller 101 of the image forming apparatus reads the content of the non-volatile memory 104 of the process cartridge 39 (step S200).

FIG. 5A is a timing chart of a read-out mode for reading the data stored in the memory of the process cartridge 39. At first the controller 101 sends, to the DI port, data "110" (first bit 1 being a dummy code, second and third bits constituting an operation code) indicating the read-out mode, followed immediately by an address (A0–A5) to be read. Then data (D15–D0) of the designated address are read from the memory and transferred, through the D0 port, to the controller 101.

FIG. 5B is a timing chart of a data write-in mode for storing the process condition or the count value into the memory of the process cartridge 39. In case of storing a copy count, the controller 101 sends, to the DI port, data "101" indicating the data write-in mode, immediately followed by a write-in address (A0–A5) and data (D0–D15) to be written.

FIG. 5C is a timing chart of a data erasure mode for erasing the data stored in the memory of the process cartridge 39. At first the controller 101 releases data "111" indicating the data erasure mode, immediately followed by an address (A0–A5) to be erased, whereby the data of the designated address are erased.

Figure 7:
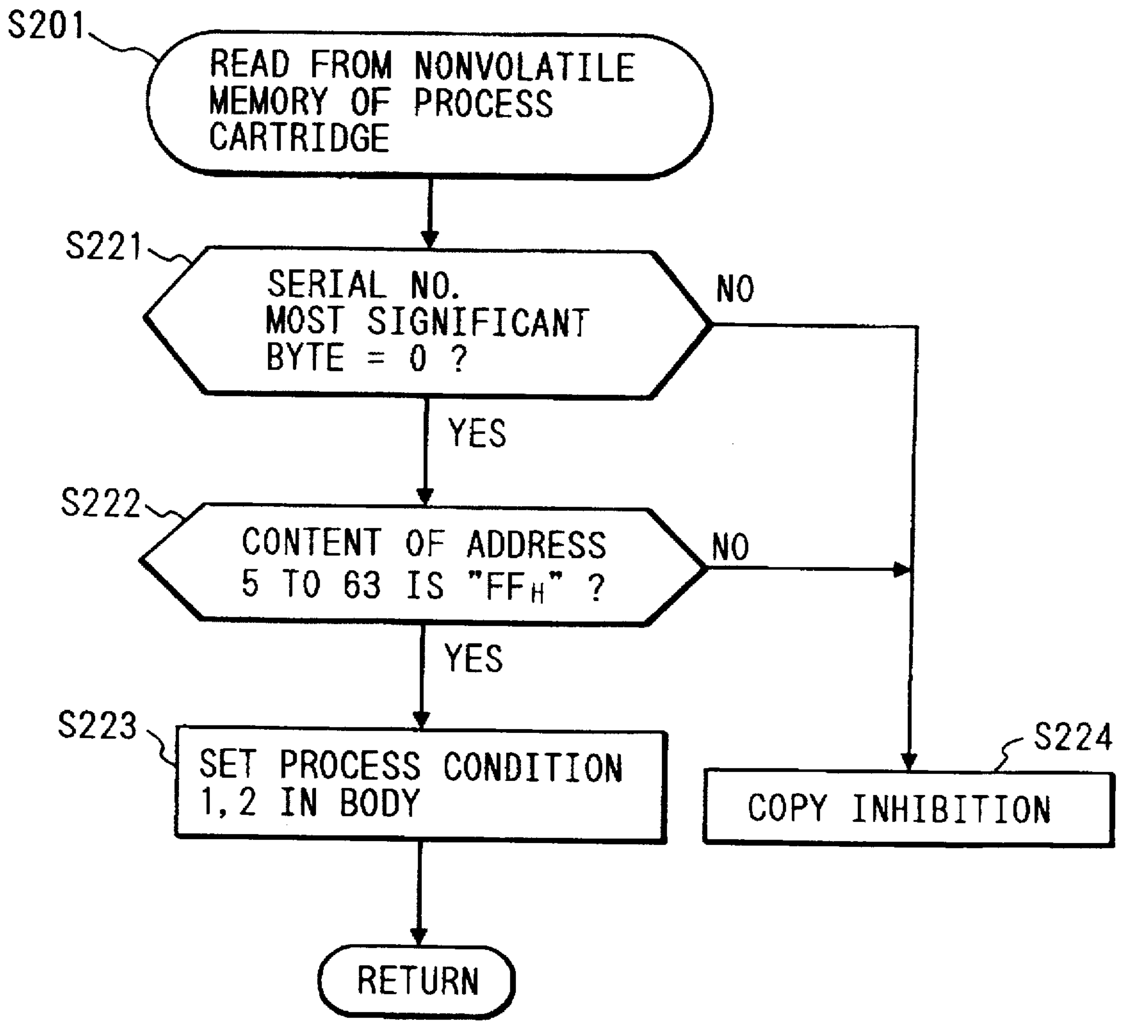
FIG. 7 is a flow chart showing a data reading subroutine of the non-volatile memory.

FIG. 7 is a flow chart showing a data reading subroutine of the non-volatile memory.

In this subroutine, there is discriminated whether the uppermost bit of the serial number in the addresses 0–1 is equal to "0" (step S221), and, if equal, there is further discriminated whether the content of the unused addresses 5–63 is "FFH" (step S222). If it is "FFH", the process conditions 1 and 2 of the non-volatile memory 104 are stored in the SRAM 102 of the main body (step S223) and the sequence returns to the main routine.

On the other hand, if the uppermost bit of the serial number is not "0" or if the content of the unused addresses is not "FFH". The copying operation is inhibited (step S224). In such situation, the content of the non-volatile memory is identified as improperly tampered with and altered.

Figure 9:
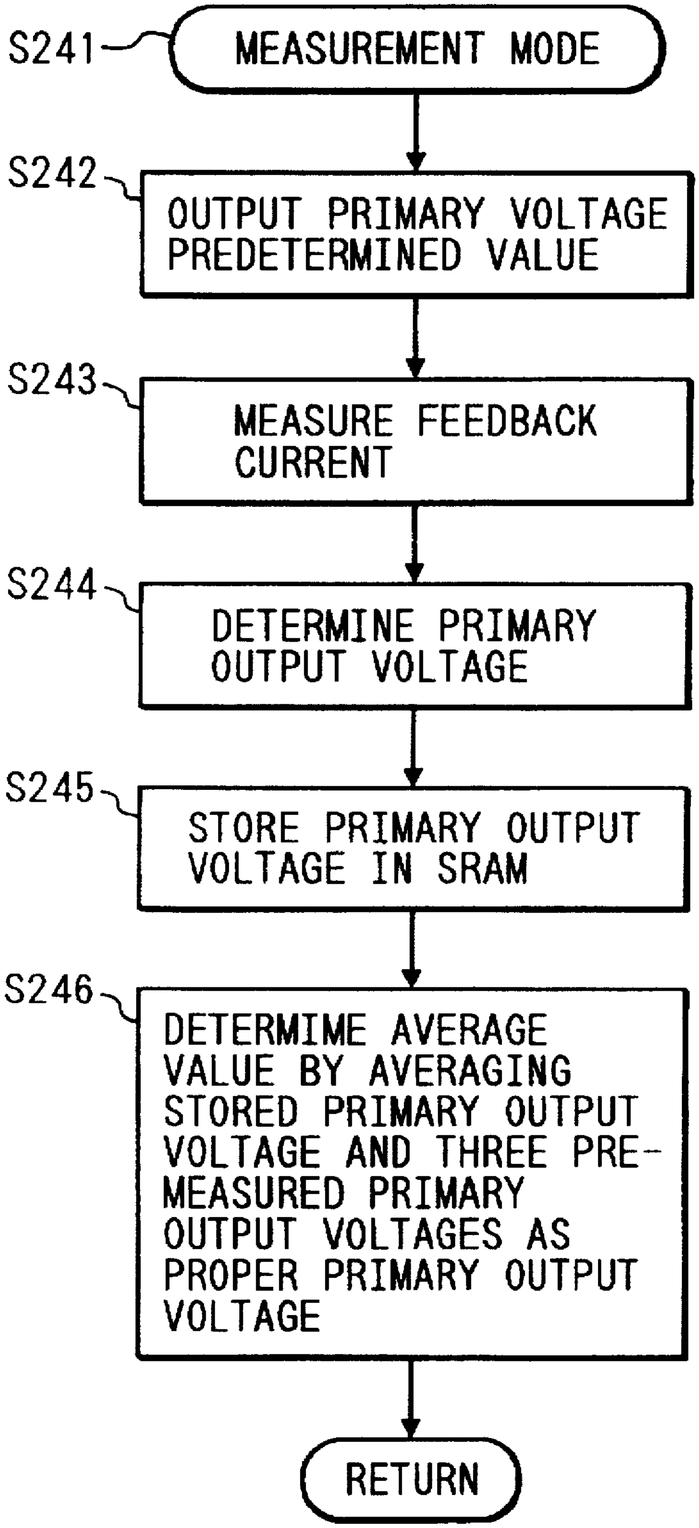
FIG. 9 is a flow chart of a measurment made subroutine.

After the data reading from the non-volatile memory 104, a count stored in advance in the SRAM 102 of the main body is compared with the count stored in the non-volatile memory 104 (said count being called drum counter) (steps S201, S202), and, if these counts are mutually equal and are not zero, a measurement mode is executed (step S203). FIG. 9 is a flow chart of a measurement mode subroutine. In the measurement mode, the primary output voltage of the process cartridge 39 is determined by charging the drum 12 with a predetermined primary voltage from the primary charger 13 and measuring the current from the drum 12. The primary output voltage thus determined is memorized in the SRAM 102 of the image forming apparatus. The SRAM 102 stores the primary output voltages determined in the past three measurement mode cycles, and an appropriate primary output voltage is determined as the average of the four primary output voltages (steps S241–S246). Thereafter the controller enters a waiting state for the actuation of the copy key (step S205). If the two counts do not mutually coincide or if they are both zero, the sequence proceeds to a process cartridge setting mode (step S204).

Figure 8:
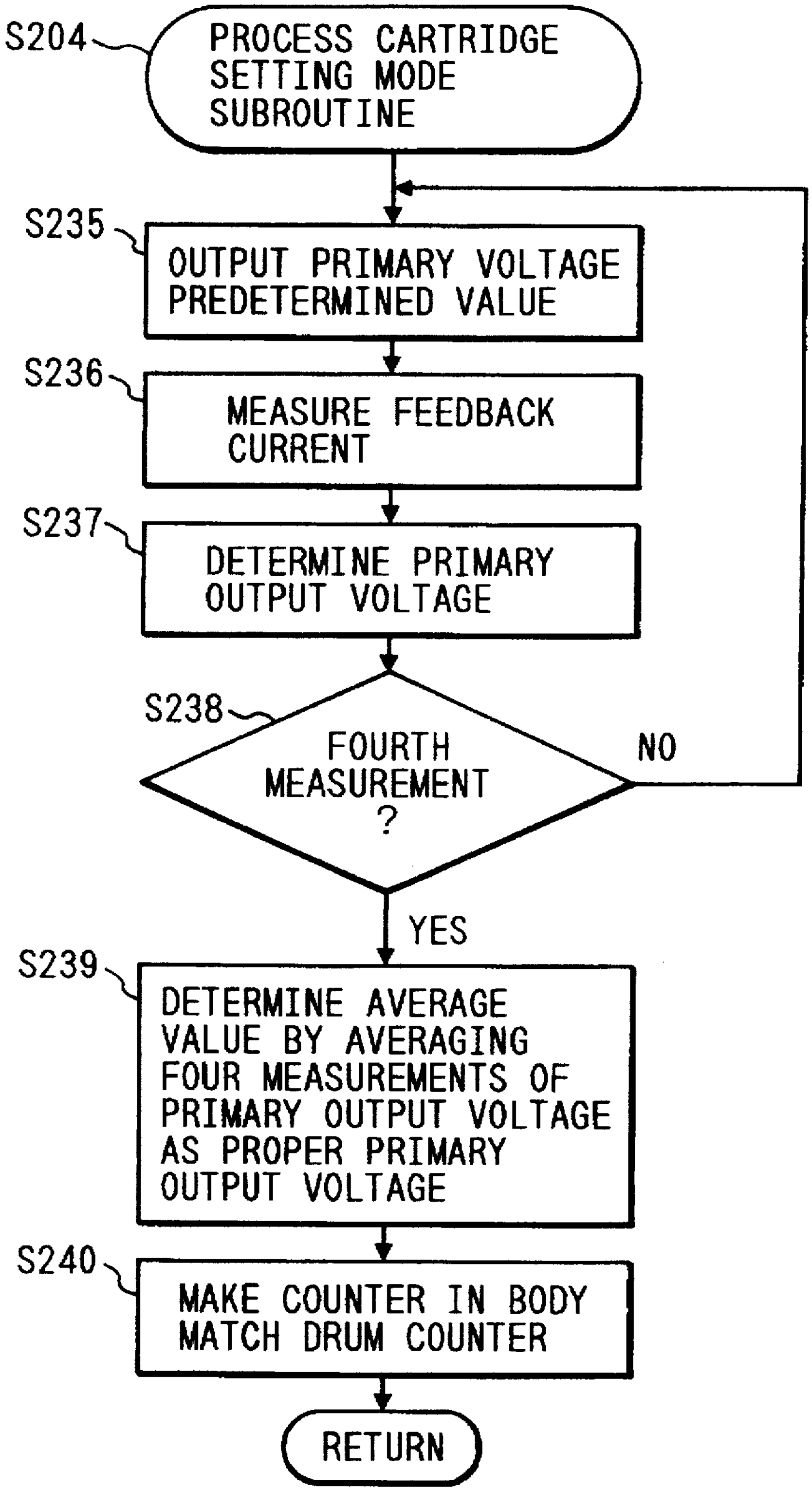
FIG. 8 is a flow chart showing a process cartridge setting subroutine.

FIG. 8 is a flow chart showing a process cartridge setting mode subroutine. In this mode, an appropriate primary output voltage in the process cartridge 39 is determined by charging the drum 12 with a predetermined primary voltage from the primary charger 13 and by measuring the current from the drum 12 (steps S235–S239). The primary output voltage is determined by repeating the measurement four times and taking the average. Then the count in the main body is set equal to the count of the drum counter (step S240), and the present subroutine is terminated.

When the copy key is actuated, the sheet feeding is executed (step S206), then the count of the drum counter is read (step S207) and compared with the count in the main body (step S208). This comparison is conducted in order to confirm whether the count of the drum counter has been properly renewed at the preceding copying operation. If both counts mutually coincide, a copying operation is executed (step S209), then the counts of the main body and of the drum counter are respectively increased by one (step S210) and the sequence returns to the step S205.

If the counts do not mutually coincide, a write-in error in the process cartridge 39 is identified and the copying operation is therefore inhibited (step S211).

It is also possible to store the appropriate primary output voltage, determined in the process cartridge setting mode, in the SRAM 102, and, in case the discrimination of the step S202 is negative, to adopt the appropriate primary output voltage stored in the SRAM 102 without execution of the measurement mode.

The present invention is not limited to the foregoing embodiment but is subjected to various modifications within the scope and spirit of the appended claims.

What is claimed is:

1. An image forming apparatus for executing image formation, in accordance with an image forming condition that influences image quality, by using a detachable process cartridge mounted thereon, the mounted process cartridge having its own particular characteristics that influence image quality, said apparatus comprising:

a first memory for storing a number of image formations;

renewal means for renewing a number of image formations stored in a second memory provided in said process cartridge and the number of image formations stored in said first memory, in response to execution of an image forming operation;

comparator means for comparing, when a power supply to said image forming apparatus is turned on, the number of image formations stored in said first memory with the number of image formations stored in said second memory; and control means adapted to effect, when the number of image formations stored in said first memory and the number of image formations stored in said second memory do not mutually coincide, a first determining operation for determining the image forming condition that influences image quality and is specific to said process cartridge.

2. An apparatus according to claim 1, wherein the first determining operation includes an operation for repeating a measurement for determining the image forming condition and averaging the measured plural image forming conditions.

3. An apparatus according to claim 1, wherein, when the number of image formations stored in said first memory coincides with the number of image formations Stored in said second memory, said control means is adapted to execute a second determining operation for determining an image forming condition specific to said process cartridge.

4. An apparatus according to claim 3, wherein the second determining operation includes an operation for effecting a measurement for determining the image forming condition and taking an average of a result of the measurement with plural image forming conditions determined in the past.

5. An image forming method for use in an image forming apparatus for executing image formation, in accordance with an image forming condition that influences image quality, by using a detachable process cartridge mounted thereon, the mounted process cartridge having its own particular characteristics that influence image quality, said method comprising the steps of:

a) renewing a number of image formations stored in a first memory provided in the image forming apparatus and a number of image formations stored in a second memory provided in the process cartridge, in response to execution of an image forming operation;

b) comparing, when a power supply to the image forming apparatus is turned on, the number of image formations stored in the first memory with the number of image formations stored in the second memory; and c) executing a first determining operation for determining an image forming condition that influences image quality and is specific to the process cartridge when the number of image formations stored in the first memory does not coincide with the number of image formations stored in the second memory.

6. A method according to claim 5, wherein said step c) is adapted to repeat a measurement for determining the image forming condition and taking an average of the measured plural image forming conditions.

7. A method according to claim 5, further comprising the step of:

d) executing a second determining operation for determining an image forming condition specific to the process cartridge when the number of image formations stored in the first memory coincides with the number of image formations stored in the second memory.

8. A method according to claim 7, wherein said step d) is adapted to execute a measurement for determining the image forming condition and taking the average of the result of the measurement with plural image forming conditions determined in the past.

9. An apparatus for executing image formation, in accordance with an image forming condition that influences image quality, by using a detachable process cartridge mounted thereon, the mounted process cartridge having its own particular characteristics that influence image quality, said apparatus comprising:

reading means for reading data, for discriminating an individual process cartridge, stored in a specific area of a memory provided in said process cartridge when a power supply to said apparatus is turned on; and inhibition means for inhibiting an image forming operation utilizing said process cartridge when data in the specific area of said memory is not a predetermined value.

10. A control method of an image forming apparatus for executing image formation, in accordance with an image forming condition that influences image quality, by using a detachable process cartridge mounted thereon, the mounted process cartridge having its own particular characteristics that influence image quality, said method comprising the steps of:

a) reading data, for discriminating an individual process cartridge, stored in a specific area of a memory provided in the process cartridge when a power supply to the image forming apparatus is turned on;

b) discriminating whether data in the specific area of the memory has a predetermined value; and c) inhibiting an image forming operation utilizing the process cartridge when the data in the specific area is not the predetermined value.

11. An apparatus according to claim 1, wherein said process cartridge has a photosensitive member on which the image is formed by an electrophotography process.

12. A method according to claim 5, wherein the process cartridge has a photosensitive member on which the image is formed by an electrophotography process.

13. An apparatus according to claim 9, wherein said process cartridge has a photosensitive member on which the image is formed by an electrophotography process.

14. A method according to claim 10, wherein the process cartridge has a photosensitive member on which the image is formed by an electrophotography process.

* * * * *

UNITED STATES PATENT AND TRADEMARK OFFICE

CERTIFICATE OF CORRECTION

PATENT NO. : 5,701,402

DATED : Dec. 23, 1997

INVENTOR(S) : Kazuki Miyamoto et al.

It is certified that error appears in the above-indentified patent and that said Letters Patent is hereby corrected as shown below:

On title page, item

[56] REFERENCES CITED

Foreign Patent Documents
"43045365" should read --3-045365--.

On drawing

SHEET 9

FIGURE 9, "DETERMIME" should read --DETERMINE--.

COLUMN 2

Line 23, "measurment" should read --measurement--.

Line 51, "unit" should read --unit 24.--.

Line 56, "of" should read --of a--.

COLUMN 3

Line 52, "are" should read --is--.

COLUMN 5

Line 7, ""FFH". The" should read --"FFH", the--.

UNITED STATES PATENT AND TRADEMARK OFFICE

CERTIFICATE OF CORRECTION

PATENT NO. : 5,701,402

DATED : December 23, 1997

INVENTOR(S) : KAZUKI MIYAMOTO ET AL.

It is certified that error appears in the above-indentified patent and that said Letters Patent is hereby corrected as shown below:

COLUMN 6

Line 30, "Stored" should read --stored--.

Signed and Sealed this

Fourteenth Day of July, 1998

Attest:

BRUCE LEHMAN

*Attesting Officer*

*Commissioner of Patents and Trademarks*